United States Patent
Cocchi et al.

(10) Patent No.: US 11,856,967 B2
(45) Date of Patent: Jan. 2, 2024

(54) METHOD FOR MAKING LIQUID OR SEMI-LIQUID FERMENTED MILK PRODUCTS

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 0 days.

(21) Appl. No.: 17/503,400

(22) Filed: Oct. 18, 2021

(65) Prior Publication Data

US 2022/0039426 A1 Feb. 10, 2022

(30) Foreign Application Priority Data

Apr. 17, 2014 (IT) ................ 2014A000222

(51) Int. Cl.
| | |
|---|---|
| A23G 9/36 | (2006.01) |
| A23C 9/12 | (2006.01) |
| A23C 9/13 | (2006.01) |
| A23G 9/08 | (2006.01) |
| A23C 9/123 | (2006.01) |
| A23G 9/40 | (2006.01) |

(52) U.S. Cl.
CPC .............. *A23G 9/363* (2013.01); *A23C 9/123* (2013.01); *A23C 9/1223* (2013.01); *A23C 9/1307* (2013.01); *A23G 9/08* (2013.01); *A23G 9/40* (2013.01)

(58) Field of Classification Search
CPC . A23G 9/363; A23G 9/08; A23G 9/40; A23C 9/1223; A23C 9/123; A23C 9/1307
USPC ................ 426/34, 42, 43, 580, 583
See application file for complete search history.

(56) References Cited

U.S. PATENT DOCUMENTS 4,163,802 A   8/1979   Redfern et al.

FOREIGN PATENT DOCUMENTS

| | | |
|---|---|---|
| CN | 201640346 U | 11/2010 |
| CN | 102232463 A | 11/2011 |
| EP | 0240326 A2 | 10/1987 |
| EP | 2338350 A1 | 6/2011 |
| GB | 2419136 A | 4/2006 |
| JP | H054889 B2 | 1/1993 |
| JP | 2003265101 A | 9/2003 |
| WO | 2004103082 A1 | 12/2004 |

OTHER PUBLICATIONS

Chinese Office Action dated Mar. 14, 2019 issued in counterpart Chinese Patent Application No. 201510245321.2.
Italian Search Report dated Dec. 4, 2014 for related Italian Application No. BO20140222.
Japanese Office Action dated January 9, 20219 issued in counterpart Japanese Patent Application No. 2015-082086.
Lee et al., "Formation and physical properties of Yogurt", Asian-Australian Journal of Animal Sciences, Suweon, KR, vol. 23, No. 9, Sep. 2010.
Office Action issued by the European Patent Office dated Feb. 1, 2018 in counterpart European Patent Application No. 16163333.6.
Otten, et al., "Accelerated Yoghourt Production by Fed-Batch Prefermentation", Netherlands Milk and Diary Journal, Pudoc, Wageningent, NL, vol. 50, No. 1, 1996.
Processing of Animal Food, Chief Editor: Yue Xiqiung, p. 44-52, China Light Industrial Press See the English Translation of the attached Chinese Office Action for a Concise Explanation of Relevance.
Tamime et al., "Yoghurt: Science and Technology", 1985, Pergamon Press, Oxford, p. 8.

*Primary Examiner* — Leslie A Wong
(74) *Attorney, Agent, or Firm* — Silvia Salvadori, P.C.; Silvia Salvadori

(57) ABSTRACT

Described is a method for making liquid and semi-liquid fermented milk products, comprising the following steps:
  a) placing a milk-based mixture in a container (3);
  b) subjecting the basic mixture to a heating thermal treatment;
  c) adding lactic bacterial strains to the basic mixture according to a concentration of at least 10^8 CFU/ml of basic mixture, and subjecting the basic mixture to which lactic bacterial strains were added to a thermal treatment for a predetermined time;
  d) stirring the mixture to which lactic bacterial strains were added in order to break a coagulated mass which formed in the mixture to which lactic bacterial strains were added, to make the liquid and semi-liquid milk products.

5 Claims, 1 Drawing Sheet

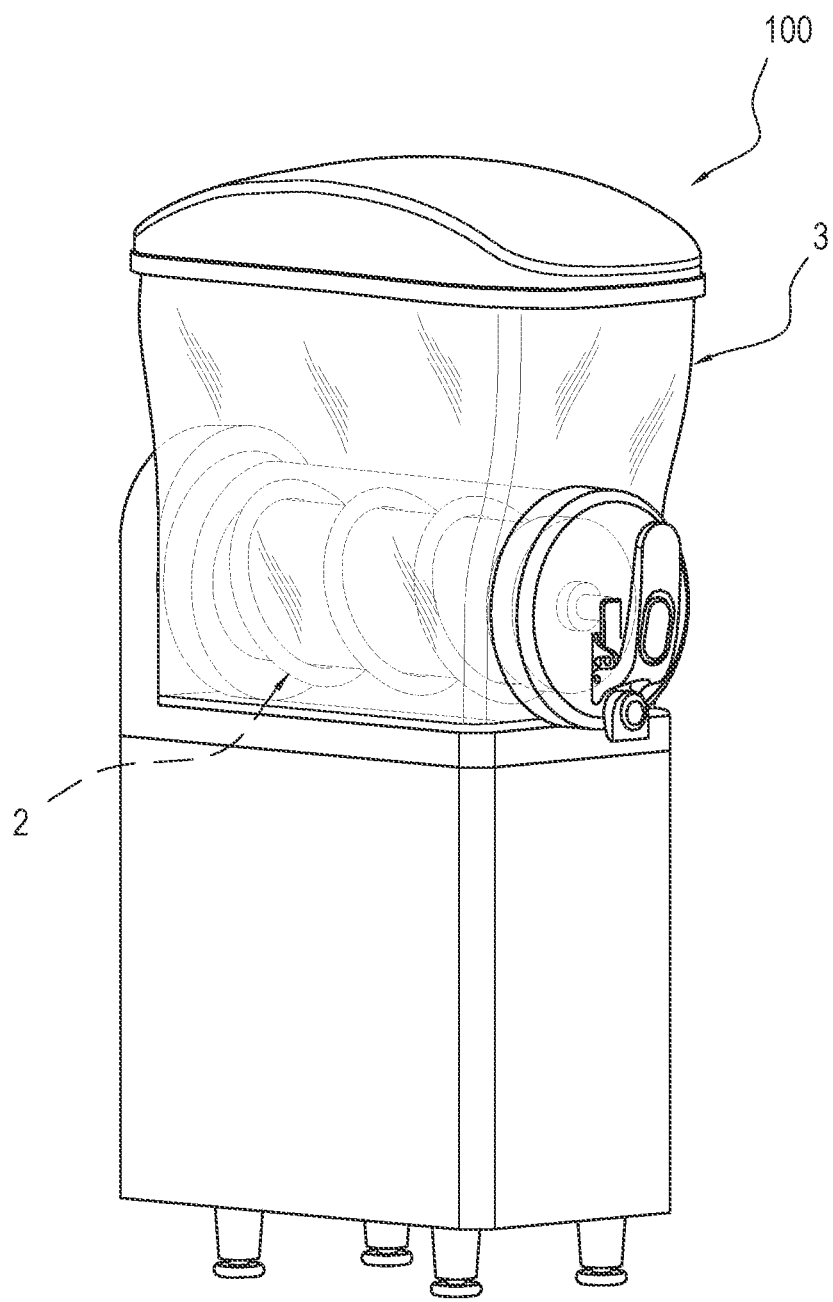

METHOD FOR MAKING LIQUID OR SEMI-LIQUID FERMENTED MILK PRODUCTS

This U.S. Non-Provisional Application is a continuation of U.S. Ser. No. 14/686,407 filed Apr. 14, 2015, now abandoned which claims priority to and the benefit of Italian Application No. BO2014Z000222 filed Apr. 17, 2014, the content of which are incorporated herein by reference in their entireties.

BACKGROUND OF THE INVENTION

This invention relates to a method for making liquid or semi-liquid fermented milk products.

This invention applies to the field of machines for the production, storage and dispensing of fermented milk products such as artisan yogurt and similar dairy products which are distributed in commercial establishments such as ice cream and yogurt parlors, confectioner's shops and the like, designed to sell to consumers natural yogurt produced in a craftsman-like fashion, if necessary with the addition of toppings.

In this context, conventional machines are known for the production of fermented milk products such as milk pasteurizing machines, devices for fermenting inoculated milk and refrigerating machines for storing fermented milk products, once produced.

These conventional machines allow the production of fermented milk products according to a production cycle defined by a predetermined sequence of operating steps which are described below.

Initially, an operator introduces the milk used for the production of fermented milk products into a containment tank of the pasteurizing machine. The pasteurizing machine heats the milk contained in the tank.

Once the pasteurizing of the milk has been completed, the milk is cooled in the containment tank of the pasteurizing machine and inoculated with milk ferments.

Subsequently, the operator draws the cooled and inoculated pasteurized milk (from the pasteurizing machine) and places it in a fermentation tank (of a fermenting device).

The fermentation tank reaches a predetermined fermentation temperature which is maintained for a predetermined time, in such a way as to induce the growth of the bacteria present.

Once the fermentation has been completed, the fermented milk is cooled to a storage temperature, and after this has been reached the production cycle of the fermented milk is completed.

At this point, the operator introduces the fermented milk produced into suitable refrigerating machines which keep the product at a predetermined temperature in such a way as to store it over time.

The above-mentioned conventional machines have several drawbacks.

Firstly, the use of a plurality of machines/devices for performing the fermented milk production cycle necessarily requires the presence of a production operator, from the pasteurization of the milk up to the obtaining of the fermented milk, thus considerably increasing the costs of the finished product due to the labor costs.

Moreover, the use of several machines/devices for making the fermented milk is particularly disadvantageous in terms of space dedicated for installing them in a small-scale artisan facility.

A further drawback and one which is even more highly felt is that linked with the lengthy time required for making a batch of fermented milk, which does not allow for a particularly high productivity unless there are a particularly high number of machines available (with added costs and reduced space available in the sales outlets).

SUMMARY OF THE INVENTION

The aim of this invention is to provide a method for the production of fermented milk products which overcomes the above-mentioned drawbacks.

Yet another aim of the invention is to provide a method for making fermented milk products which provides a particularly high productivity.

According to the invention, these aims are achieved by a method for producing fermented milk products comprising the technical features set out in one or more of the accompanying claims.

BRIEF DESCRIPTION OF THE DRAWINGS

The technical features of the invention, with reference to the above aims, are clearly described in the claims below and its advantages are apparent from the detailed description which follows, with reference to the accompanying drawing which illustrates a non-limiting example embodiment of the invention and in which:

FIG. 1 is a side view of a machine which actuates the method for making fermented milk products according to this invention.

DESCRIPTION OF THE PREFERRED EMBODIMENTS

With reference to the accompanying drawing, the numeral 100 denotes an apparatus, that is, a machine, for implementing the method according to the invention.

The machine 100 is a crushed-ice drink maker of the pasteurizing type.

The machine 100 is illustrated purely by way of an example, as the method could also be actuated in machines of a different type.

Irrespective of the machine 100, the method for making a liquid and semi-liquid product of the fermented milk type (preferably natural or with toppings) comprises, according to this invention, the following steps:
  a) placing a milk-based mixture (known hereinafter also as the basic mixture) inside a container 3 (preferably a tank);
  b) subjecting the basic mixture to a heating thermal treatment;
  c) adding lactic bacterial strains to the basic mixture according to a concentration of at least $10^8$ CFU (microbial cells)/ml of basic mixture, and subjecting the basic mixture to which bacterial strains were added to a predetermined thermal treatment for a predetermined time;
  d) stirring the mixture to which lactic bacterial strains were added in order to break the coagulated mass which formed in the mixture to which lactic bacterial strains were added, thereby making the liquid and semi-liquid product of the fermented milk type.

Preferably, the step c) comprises adding to the basic mixture lactic bacterial strains according to a concentration equal to or greater than $10^9$ CFU/ml of basic mixture.

Still more preferably, the lactic bacterial strains comprise a mixture of *Lactobacillus bulgaricus* and *Streptococcus thermophilus* if yogurt-style fermented milk is to be produced.

It should be noted that it has been found by experimentation that a concentration of lactic bacterial strains greater than 10^8 CFU/ml of milk-based mixture means that the production time of the fermented milk product is drastically reduced, whilst at the same time maintaining a high quality of the end product.

More specifically, experimental tests have shown times of less than 3 hours (that is, less than half that of prior art processes) for making fermented milk.

Advantageously, this translates into an immediate increase in productivity, with a consequent reduction in costs for the point of sale operator.

According to one aspect, the step c) of adding lactic bacterial strains to the basic mixture may comprise the following steps:
  extracting a portion of the basic mixture from the container 3;
  adding the lactic bacterial strains to the portion of basic mixture extracted;
  stirring the portion of mixture to which lactic bacterial strains were added;
  putting the portion of mixture to which lactic bacterial strains were added back into the container 3.

It should be noted that, preferably, the container 3 is provided with a stirrer 2 and with thermal treatment means (not illustrated), configured for thermally treating the mixture inside (preferably by the transmission of heat through the lateral walls of the container 3 or through the lateral walls of a heat exchanger positioned inside the container 3).

Preferably, the container 3 is a tank.

It should be noted that inside the tank 3 there is a cylinder, on the surface of which there is the stirrer 3.

The cylinder is associated with a heat exchanger of a refrigerating system, the coils of which are positioned inside the cylinder so as to exchange heat through the walls of the cylinder.

According to another aspect, the method comprises a further step of adding sugar (preferably saccharose).

Preferably, according to this aspect, the method comprises a step of adding a quantity of sugar.

The quantity of sugar added can be varied by the operator based on the particular flavors.

Preferably, the percentage of sugar in the mixture is less than 70% (by weight).

More preferably, the percentage of sugar is between 20% and 30% by weight of the milk-based mixture.

It should be noted that, preferably, after the step of adding sugar there is a step of mixing and cooling the finished product, inside a machine for the production of soft ice cream (not illustrated).

This step is implemented in particular inside the mixing and cooling cylinder of a machine for the production of soft ice cream, which is equipped with a device for stirring and with thermal treatment means.

This additional step makes it possible to stabilize further the product and to increase the quality of the product from the organoleptic point of view.

With particular reference to the above-mentioned step b) of subjecting the basic mixture to a heating thermal treatment, the method comprises a step of heating the basic mixture to a temperature value of between 38° C. and 45° C. (even more preferably to a temperature value of between 41° C. and 43° C.).

Preferably, the step b) comprises stirring the basic mixture.

Still more preferably, after the step b) there is a step of keeping the basic mixture stationary, that is, without stirring and thermal treatment (preferably at the temperature reached in step b), for a predetermined time.

Moreover, the step c) comprises a step E) of keeping the basic mixture at a temperature value of between 38° C. and 45° C. (even more preferably at a temperature value of between 41° C. and 43° C.) for a predetermined time.

The step E) of keeping the basic mixture at a temperature value of between 38° C. and 45° C. comprises two sub-steps:
  E1) a first sub-step in which the milk-based mixture to which lactic bacterial strains were added is subjected to stirring;
  E2) a second sub-step in which the milk-based mixture to which lactic bacterial strains were added is kept stationary, that is to say without stirring.

It should be noted that the first sub-step E1 precedes the second sub-step E2.

Preferably, the first sub-step has a duration of less than 10 minutes (more preferably it is less than 5 minutes).

Preferably, the second sub-step E2 has a duration less than or equal to 3 hours.

It should be noted that, for example, but without restricting the scope of the invention, step E) comprises an intermittent activation of a thermal treatment system which allows the set temperature to be maintained.

Purely by way of an example, the thermal system is activated in this step E) for a percentage of time of between 25% and 50%—still more preferably between 30% and 40%—and turned off for the remaining time.

The coagulated mass which forms naturally in the mixture is broken in step d), to obtain a homogeneous and creamy structure.

It should be noted that the coagulated mass is broken by stirring the basic mixture to which lactic bacterial strains were added in the container 3.

According to this process, the coagulation of the fermented milk occurs in the container 3.

Further, after the step d), the method comprises a step of cooling the product to a temperature for storage of the product of between 0° C. and 5° C. (preferably equal to 4° C.).

According to this aspect, the method comprises a step of stirring the product intermittently (that is, according to on-off cycles) or continuously during the cooling: this prevents the formation of ice inside the container during the cooling (which would cause a degradation of the quality of the product).

It should be noted that the method also comprises a step for dispensing the product from the container 3, for its storage or distribution.

It should be noted that the sequence of steps described above makes it possible to obtain large quantities of fermented milk in an extremely short time the (a few hours), increasing the overall productivity of the sales outlets.

Further, according to another aspect, the fermented milk is subjected to a subsequent step of simultaneous cooling and stirring, that is, of subjecting the fermented milk to mixing and cooling.

In this way, the fermented milk is subjected to mixing and cooling, to obtain a finished product (for example ice cream) which has an increased volume due to the effect of incorporating air during the simultaneous cooling and stirring.

Preferably, the fermented milk is subjected to mixing and cooling after sugar has been added to it.

The mixing and cooling step occurs inside a machine for the production of soft ice cream.

The invention claimed is:

1. A method for making a milk product, characterised in that it comprises the following steps:
   a) placing a milk-based mixture comprising an amount of sugar of 20-30 wt. % with respect to the weight of the mixture in a container (3);
   b) heating the milk-based mixture to a temperature value of between 41° C. and 43° C. and keeping said milk-based mixture stationary for a time between 5 and 15 minutes at a temperature value of between 41° C. and 43° C.;
   c) adding lactic acid bacterial strains to said milk-based mixture according to a concentration of at least 10^8 CFU/ml of milk-based mixture, and subjecting said milk-based mixture containing the added lactic acid bacterial strains to a thermal treatment for a predetermined time, wherein the step c) consists of a step e) of keeping the milk-based mixture at a temperature of 41° C.-43° C., the step e) consisting of
   e1) a first sub-step in which the milk-based mixture containing the added lactic acid bacterial strains is subjected to stirring for less than 10 minutes; and
   e2) a subsequent second sub-step in which the milk-based mixture containing the lactic bacterial strains is kept stationary, without stirring;
   d) stirring said milk-based mixture containing the added lactic bacterial strains in order to break a coagulated mass which formed in said milk-based mixture containing the added lactic bacterial strains, thereby making a milk product of the fermented milk type in the container (3) in less than 3 hours, said lactic bacterial strains consisting of a mixture of *Lactobacillus bulgaricus* and *Streptococcus* thermophiles to obtain a milk product;
   wherein the milk product is subsequently subjected to a step of cooling simultaneously with stirring, wherein said method is implemented in its entirety in the container (3).

2. The method according to claim 1, wherein said milk product is yogurt.

3. The method according to claim 1, wherein said lactic bacterial strains are added to said milk-based mixture in a concentration greater than 10^9 CFU/ml of milk-based mixture.

4. The method according to claim 1, wherein a quantity of sugar added to the milk-based mixture, as a percentage, is less than 70% by weight of the milk-based mixture.

5. The method according to claim 1, wherein the second sub-step 2e, in which the milk-based mixture containing the added lactic bacterial strains is kept stationary, without stirring, with intermittent activation of a thermal treatment.

\* \* \* \* \*